(12) United States Patent
Santiago

(10) Patent No.: US 9,942,924 B1
(45) Date of Patent: Apr. 10, 2018

(54) QSO CONFIRMATION SYSTEM AND METHOD THEREOF

(71) Applicant: Carlos L. Santiago, Caguas, PR (US)

(72) Inventor: Carlos L. Santiago, Caguas, PR (US)

(*) Notice: Subject to any disclaimer, the term of this patent is extended or adjusted under 35 U.S.C. 154(b) by 0 days.

(21) Appl. No.: 14/730,184

(22) Filed: Jun. 3, 2015

Related U.S. Application Data

(60) Provisional application No. 62/007,227, filed on Jun. 3, 2014.

(51) Int. Cl.
*H04W 76/02* (2009.01)
*H04W 12/06* (2009.01)
*H04W 12/04* (2009.01)

(52) U.S. Cl.
CPC ......... *H04W 76/021* (2013.01); *H04W 12/04* (2013.01); *H04W 12/06* (2013.01)

(58) Field of Classification Search
CPC ............... H04L 12/1845; H04M 7/006; H04N 21/25816; H04N 21/25875; H04N 21/4307; H04N 21/4627; H04N 21/8106; H04W 4/02; H04W 84/00; H04W 76/005; G05D 1/0011; G05D 1/0255; G06Q 10/10; G06F 17/00; H04B 17/02; H04H 60/33; H04H 60/35
See application file for complete search history.

(56) References Cited

U.S. PATENT DOCUMENTS

| | | | | |
|---|---|---|---|---|
| 4,768,033 A * | 8/1988 | Sakai | ...................... | H04B 1/401 370/494 |
| 9,152,900 B1 * | 10/2015 | Santiago | ............ | G06K 15/4095 |
| 2004/0073555 A1 * | 4/2004 | Hevener | ................... | H04B 1/06 |
| 2005/0125497 A1 * | 6/2005 | Hevener | ................ | G06Q 10/10 709/205 |
| 2005/0273330 A1 * | 12/2005 | Johnson | .............. | G10L 19/0018 704/246 |
| 2006/0067344 A1 * | 3/2006 | Sakurai | ............... | H04L 12/2854 370/401 |
| 2006/0141928 A1 * | 6/2006 | Hosokawa | ............. | H04B 17/40 455/9 |
| 2016/0156974 A1 * | 6/2016 | Vitalis | ................ | H04N 21/4627 725/25 |

FOREIGN PATENT DOCUMENTS

JP        JO2001313601 A   * 11/2001

OTHER PUBLICATIONS

English Translation of Mizushima, Akihiro JP 2001313601 A.*

* cited by examiner

*Primary Examiner* — David Bilodeau

(74) *Attorney, Agent, or Firm* — Hoglund & Pamias, PSC; Roberto J. Rios

(57) ABSTRACT

The present invention provides a system and a method for confirming a "QSO" between two amateur radio stations. The invention provides a unique ID code that is encoded and transmitted from one of the radio stations to the other radio station, which in turn decodes said encoded unique ID code using a previously assigned decoding key. A server is connected to both radio station to assign, encode, transmit, received, decode and retrieve the transmitted code completing a cycle (loop) between two stations validating their radio connection and the reach of each other over the radio waves.

16 Claims, 1 Drawing Sheet

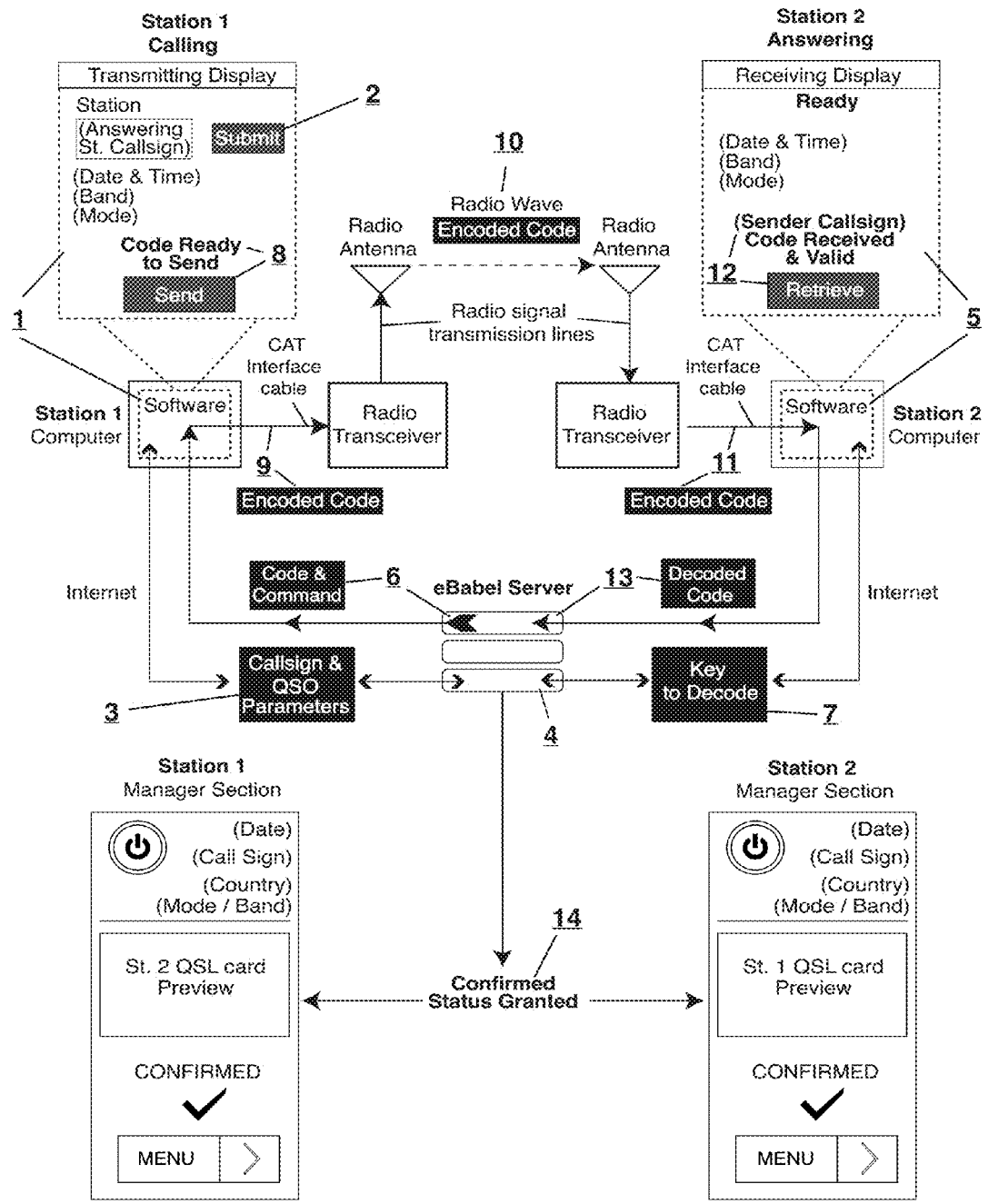

QSO CONFIRMATION SYSTEM AND METHOD THEREOF

BACKGROUND OF THE INVENTION

There are two existing methods for a radio contact confirmation between two amateur radio stations (the term use is "QSL"—Can you acknowledge receipt?), the QSL card exchange traditionally by mail or QSL bureau (a group voluntary Amateur Radio Operators around the world, QSL Managers) and the electronic logbook match up in a database system. For example, Logbook of The World (LoTW), the American Radio Relay League (ARRL) online system, make this electronic matching and confirm the contact. However, a QSL post card is not sent. Traditionally the QSL post card by mail service or QSL Bureau was the method of confirmation of a radio contact (QSO) between amateur stations. Sometimes, it takes years to receive a QSL card by mail or Bureau and in many occasions the stations have to send money to the other station to pay for the mailing process.

The QSL card is a very desirable item by most of the amateur radio operators around the world because it is a solid evidence of their achievements and thus, it has become an integral part of the hobby tradition. The QSL card is a piece of evidence that lasts for a lifetime, a piece of other country, other culture and a collectible item.

Alternatively, with the use of the electronic log match came the digital QSL postcard exchange, wherein the users have the ability to send and receive a digital QSL card when a log match takes place. This digital QSL card can be downloaded and managed in a local computer of the users. However, this generates a problem of fraud and fake confirmations due to the advancement in digital manipulation now a day. For that reason, the ARRL and many other Radio Organizations does not recognize the eQSL system cards to be a valid confirmation method to obtain any award granted by these organizations. If the user wants to submit this cards for award purposes, the granting organizations have to print the cards and send it back to the sending station for signing and then submit it for awards.

Also, it is a very common practice to obtain the accounts security username, passwords and certificates software to simulate a QSO confirmation. Thus, many stations around the world are hesitant to use any of these two systems because of the security issues, the lack of quality, complexity and poor offering in terms of choices.

Thus, what is needed is a simple yet secure QSO confirmation system that allows the exchange of confirmed and valid QSL cards between two users for printing and exchanging QSL cards while at the same time providing a fraud-free submission and certification system.

BRIEF DESCRIPTION OF THE DRAWINGS

Further features and advantages of the invention will become apparent from the following detailed description taken in conjunction with the accompanying FIGURE showing illustrative embodiments of the invention, in which:

FIG. 1 illustrates the general operation of system according to the present invention.

DETAILED DESCRIPTION OF THE INVENTION

The system and method of the present invention will be described in conjunction with FIG. 1. Each station must have an amateur radio digital modes station setup including a computer connected to a radio transceiver preferably with a CAT interface (Computer Aided Transceiver), or any equivalent thereof. Radio control software is provided and configured for digital modes communications with the eBabel system preferably via plug-ins, API and/or standalone eBabel software applications installed at the station user's computer. All this is required to establish a connection to the eBabel server via Internet. This client/server setup provides the capability of inquiring station user's status and synchronization as well as requesting, receiving, transmitting, decoding and managing the eBabel system codes.

In practice, a user of Station-1 who wants to establish communication with other stations will issue a CQ call until a communication is established when a user of Station-2 responds the first user's CQ request and provides station-2 callsign. At that time, the user of Station-1 will enter Station-2 callsign into the software application 1 sending the information to the eBabel System 4 to start the status verification process. The information 3 provided to the eBabel server 4 consists at least of the answering station callsign to establish synchronization between the stations and the QSO parameters such as: Date & Time (UTC), Band (radio frequency) and Mode for verifying equal parameters between the two stations. Once the information 3 submitted by the Station-1 is received at the eBabel server 4, the system proceeds to search the accessibility of the answering Station-2 on the system by verifying at least the communications parameters such as: Date & Time (UTC), Band (radio frequency) and Mode. This is done to establish a connection with the local software application 5 installed in Station-2 computer. Once the system validates that both stations are synchronized, it will send an ID code 6 to the computer of calling Station-1 that will provided and encoded code 9 to be transmitted in digital mode by its radio transceiver and a decoding key 7 to the computer of calling Station-2 for decoding said encoded code 9 when received by its radio transceiver.

The code 6 sent by the eBabel System 4 to be transmitted by Station-1 contains a series of numbers and letters unique for the QSO. Preferably, the code 9 is transmitted in the same digital modes used by the amateur radio operators during digital mode communications e.g. Morse Code, RTTY (Radioteletype), Packet, Tor Modes, PSK31, etc. The system 4 will instruct the local software what mode to use alternating these modes among the different QSOs taking place. None of the stations know what mode the system will instruct them to transmit their codes. For that reason the system will send the decoding key 7 (the transmission mode to be expected and use it to decode) to the station receiving the transmission. In other words, the eBabel system 4 will assign, encode, transmit, receive, decode and retrieve the transmitted code completing a cycle (loop) between two stations validating their radio connection and the reach of each other over the radio waves.

A Graphical User Interface (GUI) is provided for each local software applications 1 and 5 in accordance to the user's interaction with the eBabel system 4. Since Station-1 is initiating the QSO a screen is provided at the Station-1 computer display, wherein the GUI provides a text input control for allowing the user at Station-1 to enter information such as: the answering station callsign (Station-2) and any associated QSO parameters. Once the information is entered the user clicks a "Submit" button 2 so that the local software applications 1 sends the information 3 to the eBabel system 4. Once the system 4 validates that both stations are synchronized, it will send the ID code 6 to the local software application 1 and a notification message will be displayed to the user indicating that the code is ready to be send. A "Send" button becomes available for instructing the system to transmit the encoded code 9. The local software application 1 encodes the code 6 to the commanded mode by the system and immediately the encoded code 9 is transmitted via the Station-1 radio transceiver and its associated antenna.

At the same time, a screen is provided at the Station-computer display, wherein the GUI provides a "Ready" notification once the local software application 5 is synchronized with the eBabel system 4 and the Station-1 local software application 1 (i.e., the QSO parameters are validated). After the encoded code 9 is transmitted over the air 10 and received at the Station-2 antenna, the transceiver sends the received encoded code 11 to the local software application 5 for further decoding by means of the decoding key 7 previously sent by the eBabel system 4. Once the local software application 5 at Station-2 received and decoded coded code, the GUI provides screen with a "Code Received & Valid" notification that is displayed at the Receiving Display window along with the callsign of the sender (Station-1). A "Retrieve" button is available to send back the decoded code and its related information to the eBabel Server 4. Finally, after the eBabel System 4 has received all the information (with the proper validations) a "Confirmed" status is granted to both users. In a preferred embodiment, once the "Confirmed" status is granted to both users their respective QSL Cards could be available for printing at their Manager Sections of the eBabel system according the present invention. Accordingly, the present invention provides a 3-step validation system, wherein the first validation occurs when both users are logged to their respective eBabel system accounts, the second validation occurs when the local software application 1 at Station-1, the local software application 5 at Station-2 and the eBabel system are all synchronized and the third validation occurs when the eBabel System 4 has received all the information (with the proper validations).

Although the present invention has been described herein with reference to the foregoing exemplary embodiment, this embodiment does not serve to limit the scope of the present invention. Accordingly, those skilled in the art to which the present invention pertains will appreciate that various modifications are possible, without departing from the technical spirit of the present invention.

I claim:

1. A method of confirming a "QSO" between two ham Radio Stations, the method comprising:
   receiving at a server identifying information related to a second radio station, wherein said identifying information is provided by a first radio station;
   providing to said first radio station a unique ID code; and
   receiving at said server said unique ID code, wherein said unique ID code is provided by the second radio station, effectively confirming the QSO between said first and second radio stations.

2. The method of claim 1, further comprising the step of verifying, prior to providing said unique ID code to said first radio station, that the second radio station is connected to said server.

3. The method of claim 2, further comprising the step of validating at said server the identifying information once the second radio station is connected to said server.

4. The method of claim 1, wherein said identifying information comprises a Callsign of said second radio station.

5. The method of claim 4, wherein said identifying information further comprises at least one of: Date & Time (UTC), Band (radio frequency) and Mode.

6. The method of claim 1, wherein the step of providing to said first radio station the unique ID code further comprises providing encoding instructions to said first radio station so that said unique ID code is encoded at said first radio station based on said encoding instructions.

7. The method of claim 1, further comprising providing to said second radio station a decoding key so that the unique ID code received at said server is previously decoded by said second radio station.

8. A method of confirming a "QSO" between two ham Radio Stations, the method comprising:
   providing to a server identifying information related to a second radio station, wherein said identifying information is provided by a first radio station;
   receiving at said first radio station a unique ID code provided by said server;
   encoding said unique ID code at said first radio station and transmitting said encoded unique ID code to said second radio station; and
   receiving from said server a confirmation that the QSO between said first and second radio stations was validated based in part on a decoding of said encoded unique ID code by said second radio station.

9. The method of claim 8, wherein said identifying information comprises a Callsign of said second radio station.

10. The method of claim 9, wherein said identifying information further comprises at least one of: Date & Time (UTC), Band (radio frequency) and Mode.

11. The method of claim 8, wherein the step of receiving at said first radio station the unique ID code further comprises receiving encoding instructions from said server so that said unique ID code is encoded at said first radio station based on said encoding instructions.

12. A method of confirming a "QSO" between two ham Radio Stations, the method comprising:
   receiving at a first radio station a decoding key, wherein said decoding key is provided by a server;
   receiving at said first radio station an encoded unique ID code, wherein said encoded unique ID code is provided by a second radio station;
   decoding at said first radio station said encoded unique ID code using the received decoding key to obtain said unique ID code; and
   providing said unique ID code to said server for confirming the "QSO" between said first and second radio stations.

13. A system for confirming a "QSO" between two ham Radio Stations, the system comprising:
   a first radio station including a first computer and a first transceiver connected to said first computer;
   a second radio station including a second computer and a second transceiver connected to said second computer;
   a server connected to said first radio station and said second radio station, wherein said first radio station provides to said server identifying information related to said second radio station and in return said server provides a unique ID code to said first radio station and also provides a decoding key to said second radio station;
   said first radio station encodes said received unique ID code based on said decoding key and transmits said encoded unique ID code to said second radio station via said first transceiver;

said second radio station receives said transmitted encoded unique ID at the second transceiver and decodes said received encoded unique ID code using the decoding key to generate the unique ID code, wherein said second radio station provides said unique ID code to the server which in turn confirms the "QSO" between said first and second radio station.

14. The system of claim 13, wherein said first computer encodes said unique ID code and said second computer decodes said received encoded unique ID code.

15. The system of claim 13, wherein said identifying information comprises a Callsign of said second radio station.

16. The method of claim 15, wherein said identifying information further comprises at least one of: Date & Time (UTC), Band (radio frequency) and Mode.

* * * * *